April 18, 1933.  P. E. FENTON  1,904,722
SEPARABLE FASTENER
Filed July 12, 1930
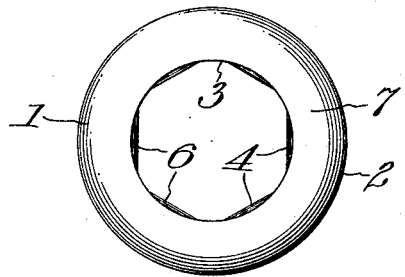
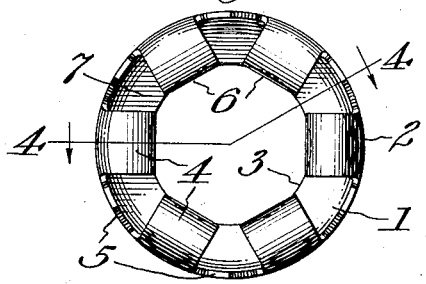
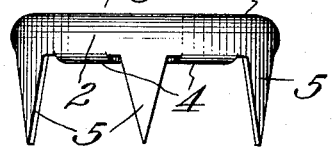
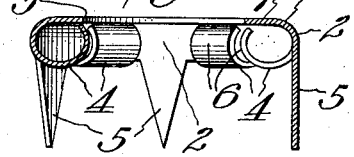
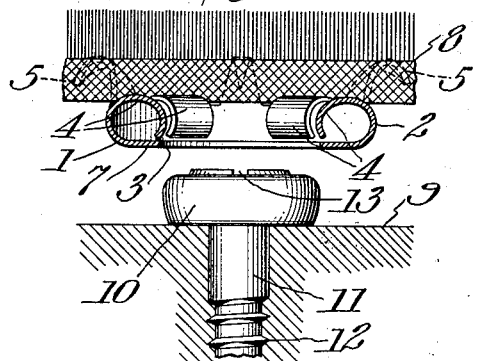
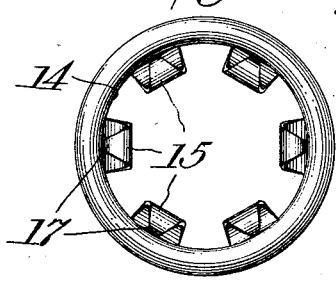
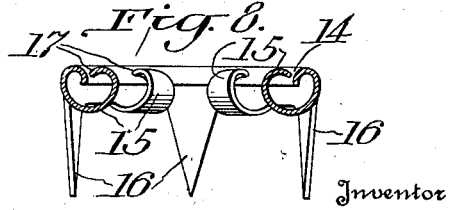
Inventor
Paul E. Fenton
by
Wm. H. Finckel
Attorney Patented Apr. 18, 1933

1,904,722

UNITED STATES PATENT OFFICE

PAUL E. FENTON, OF THOMASTON, CONNECTICUT, ASSIGNOR TO SCOVILL MANUFACTURING COMPANY, OF WATERBURY, CONNECTICUT, A CORPORATION OF CONNECTICUT

SEPARABLE FASTENER

Application filed July 12, 1930. Serial No. 467,569.

This invention relates to separable fasteners, and particularly to the socket members of separable fasteners adapted for use primarily as carpet fasteners.

The object of the invention is to provide a resilient socket member for separable fasteners, of simple and economical construction, and having such structural characteristics that it may be engaged with and disengaged from its complemental stud member with ease, thus guarding against the tearing of the article, such as a carpet, by which it is carried, and prolonging the serviceable life of the fastener.

The invention comprises a socket member for separable fasteners, particularly carpet fasteners, having a body, preferably of annular form and relatively rigid. This body is provided with an exterior offstanding flange and with an interior aperture to receive the complemental stud member of the fastener, and the flange is provided with wings curled inwardly to form resilient stud-engaging members, and with means, preferably deformable prongs, by means of which the socket member may be applied to an article, such as a carpet, all as will be hereinafter more particularly explained and finally claimed.

In the accompanying drawing illustrating the invention, in the several figures of which like parts are similarly designated, Figure 1 is a face view of a socket member embodying the features of the invention; Fig. 2 is a back view, and Fig. 3 is a side elevation of same. Fig. 4 is a sectional view taken on line 4—4 of Fig. 2. Fig. 5 is a sectional view similar to Fig. 4, showing the socket member applied to a carpet. Fig. 6 is a fragmentary detail side elevational view of a stud member suitable for cooperation with the socket member of the invention. Figs. 7 and 8 are, respectively, a face view and an axial sectional view of a modified form of the invention.

In the form of the invention illustrated in Figs. 1 to 5, inclusive, the socket member comprises a body 1, preferably of annular form, having an offstanding exterior flange 2 and an interior opening 3. The body 1 and its flange 2 are made relatively rigid so that the member may not be crushed or disturbed when in use.

The flange 2 is so formed as to provide a plurality of wings 4 and deformable prongs 5 integral with and extending from its outer edge, the prongs forming a means whereby the member may be applied to an article.

The wings 4 are curled inwardly, as shown particularly in Figs. 4 and 5, and form resilient stud-engaging members. As will be apparent, particularly by reference to Figs. 1 and 2, the curled portions of the wings extend within the peripheral limits of the opening 3, as indicated at 6, so that they may engage the stud member when it is inserted through the opening, as will be hereinafter explained.

The wings 4, being formed as they are, as a part of the flange 2, are of such a length when curled inwardly as to give them marked resiliency, thus making them capable of radial, as distinguished from axial, movement and providing for easy engagement with and disengagement of the socket member from the complemental stud member, and at the same time materially increasing the serviceable life of the fastener.

The face portion 7 of the body 1 extends horizontally over and protects the wings 4 and tends to prevent undesirable distortion of same when in use, and the opening 3 is thus made of such a size as to guide the stud into engagement with the portions 6 of the wings 4.

In Figs. 5 and 6 the socket member is shown applied to a carpet 8 and a complemental stud member is shown in a floor or other surface 9. The socket member is applied to the carpet 8 from the back of same, as shown, by passing the prongs 5 through the carpet and clinching them therein, either by turning their points outwardly, as illustrated, or by turning them inwardly, as desired, thus securely affixing the member to the carpet.

The stud member shown is of a conventional type having a rigid head 10 of such diameter as to produce a snap action of the resilient wings 4 over it, and a shank 11, which may be screwthreaded as indicated at 12, a screwdriver nick or slot 13 being provided by which it may be driven into the floor or other surface 9.

In the form of the invention illustrated in Figs. 7 and 8, the face portion 7 of Figs. 1 to 5 is replaced by the inwardly rolled face portion 14 of the body to give it the desired strength and rigidity.

The wings 15 and prongs 16 have the same functional characteristics as the similar parts previously described, but the wings 15 are curled into close proximity to the edge of the opening formed by the rolled-in face portion 14 of the body, as indicated at 17, to thus guide the stud member into proper engagement with the socket member and prevent exceeding the limit of resilience of the wings 15, or in other words, their distortion.

Attention is directed to the fact that in the form of the invention shown in Figs. 1 through 5, the wings 4 are curved inwardly throughout their entire length and normally out of contact with the face portion 7 and only contact therewith to preserve them against distortion, as already stated; and attention is also called to the fact that in the form of the invention shown in Figs. 7 and 8, the wings 15 likewise are curved inwardly throughout their entire length and normally out of contact with the face portion 14 and only contact therewith to preserve them against distortion, as already stated.

Various changes in addition to those specifically referred to are considered to be within the spirit of the invention and the scope of the following claims.

What I claim is:—

1. A socket member for separable fasteners, including a body provided with an offstanding exterior flange and having an inwardly extending rolled-in face portion provided with an interior opening for the reception of a stud member, the edge of said flange remote from said face portion being provided with a plurality of wings curled inwardly throughout their entire lengths and arranged substantially radially of said socket member and forming curvilinear radially yieldable resilient stud-engaging members terminating short of the edge surrounding the opening and contacting therewith only when said wings are approaching their elastic limit and thereby preserving their elastic limit.

2. A socket member for separable fasteners, including a body provided with an offstanding exterior flange and having an inwardly extending face portion provided with an interior opening for the reception of a stud member, the edge of said flange remote from said face portion being provided with a plurality of wings curled inwardly throughout their entire lengths and arranged substantially radially of said socket member and forming curvilinear radially yieldable resilient stud-engaging members terminating short of the edge surrounding the opening and contacting therewith only when said wings are approaching their elastic limit and thereby preserving their elastic limit.

In testimony whereof I have hereunto set my hand this 11th day of July A. D. 1930.

PAUL E. FENTON.

CERTIFICATE OF CORRECTION.

Patent No. 1,904,722.  April 18, 1933.

PAUL E. FENTON.

It is hereby certified that error appears in the printed specification of the above numbered patent requiring correction as follows: Page 1, line 30, for "drawing" read "drawings"; and line 51, for "disturbed" read "distorted"; and that the said Letters Patent should be read with these corrections therein that the same may conform to the record of the case in the Patent Office.

Signed and sealed this 13th day of June, A, D. 1933.

M. J. Moore.

(Seal)  Acting Commissioner of Patents.